(12) United States Patent
Sneed et al.

(10) Patent No.: US 12,373,327 B2
(45) Date of Patent: Jul. 29, 2025

(54) DATA LOGGING FOR API USAGE ANALYTICS

(71) Applicant: Twilio Inc., San Francisco, CA (US)

(72) Inventors: Brandon Sneed, Oregon City, OR (US); Cody Garvin, Camas, WA (US); Pooya Jaferian, Vancouver (CA)

(73) Assignee: Twilio Inc., San Francisco, CA (US)

( * ) Notice: Subject to any disclaimer, the term of this patent is extended or adjusted under 35 U.S.C. 154(b) by 15 days.

(21) Appl. No.: 17/661,258

(22) Filed: Apr. 28, 2022

(65) Prior Publication Data

US 2023/0350782 A1    Nov. 2, 2023

(51) Int. Cl.
*G06F 11/3604* (2025.01)
*G06F 9/54* (2006.01)

(52) U.S. Cl.
CPC .......... *G06F 11/3612* (2013.01); *G06F 9/542* (2013.01)

(58) Field of Classification Search
CPC ............................. G06F 9/542; G06F 11/3612
See application file for complete search history.

(56) References Cited

U.S. PATENT DOCUMENTS

| | | | |
|---|---|---|---|
| 9,679,139 B1* | 6/2017 | Monastyrsky | G06F 21/53 |
| 2007/0288897 A1* | 12/2007 | Branda | G06F 8/70 |
| | | | 717/124 |
| 2015/0193280 A1* | 7/2015 | Han | G06F 11/302 |
| | | | 719/318 |
| 2017/0004310 A1* | 1/2017 | Ivanov | G06F 21/565 |
| 2019/0121977 A1* | 4/2019 | Gordeychik | G06F 21/566 |
| 2019/0324513 A1* | 10/2019 | Hu | G06F 1/28 |
| 2021/0006478 A1* | 1/2021 | Levitt | G06N 20/00 |
| 2022/0066848 A1* | 3/2022 | Cho | G06F 9/547 |

FOREIGN PATENT DOCUMENTS

| | | | | |
|---|---|---|---|---|
| CN | 103514075 A | * | 1/2014 | ......... G06F 11/3003 |
| CN | 103514075 B | * | 6/2016 | ......... G06F 11/3003 |
| CN | 113835952 A | * | 12/2021 | ............ G06F 11/302 |
| CN | 115658135 A | * | 1/2023 | |
| JP | 2018041438 A | * | 3/2018 | ............ G06F 21/53 |

* cited by examiner

*Primary Examiner* — Phillip H Nguyen
(74) *Attorney, Agent, or Firm* — Schwegman Lundberg & Woessner, P.A.

(57) ABSTRACT

Systems, methods, and computer-readable storage mediums for performing specialized data logging on a client device are disclosed. Observability data pertaining to an API on a client device is captured. The observability includes, for each of one or more functions of the API, a number of times the function is used and a number of times each parameter of the function is used. The observability data pertaining to the API is communicated to a target based on a type of the observability data.

20 Claims, 13 Drawing Sheets

1100

1102 — Capture observability and/or metrics data pertaining to an API usable by a client device 1104 — Communicate the observability and/or metrics data to a target based on a type of the observability data

```
@discardableResult
internal func process<E: RgmEvent>(incomingEvent: E) -> E? {
    // apply .before and .enrichment types first ...
    let beforeResult = applyPlugins(type: .before, event: incomingEvent)
    // .enrichment here is akin to source middleware in the old analytics-ios.
    let enrichmentResult = applyPlugins(type: .enrichment, event: beforeResult)

// once the event enters a destination, we don't want
    // to know about changes that happen there. those changes
    // are to only be received by the destination.
    _ = applyPlugins(type: .destination, event: enrichmentResult)

// apply .after plugins ...
    let afterResult = applyPlugins(type: .after, event: enrichmentResult)

return afterResult
}
```

FIG. 4

```
1   //
2   //  UIKitScreenTracking.swift
3   //  SegmentUIKitExample
4   //
5
6   //
7
8   import Foundation
9   import Segment
10  import UIKit
11
12  /**
13  Example plugin to replicate automatic screen tracking in iOS.
14  */
15  // Conform to this protocol if self-tracking screens are desired
16  @objc protocol UIKitScreenTrackable: NSObjectProtocol {
17      @objc func sag__trackScreen(name: String?)
18
19  }
20  class UIKitScreenTracking: UtilityPlugin {
21      static let notificationName = Notification.Name(rawValue: "UIKitScreenTrackNotification")
22      static let screenNameKey = "name"
23      static let controllerKey = "controller"
24
25      var type: PluginType = .utility
26
27      var name: String
28      var analytics: Analytics
29      required init(name: String, analytics: Analytics) {
30          self.name = name
31          self.analytics - analytics
32
33
34          setupUIKitHooks()
35      }
36      internal func setupUIKitHooks() {
37          swizzle(forClass: UIViewController.self,
38              original: vselector(UIViewController.viewDidAppear(_:)},
39              new: vselector(UIViewController.seg__viewDidAppear)
40
41      }
42      swizzle(forClass: UIViewController.self,
43          original: vselector(UIViewController.viewDidDisappear(_:)},
44          new: vselector(UIViewController.seg__viewDidDisappear)
```

FIG. 5

```
1    let segment = segmentTarget("segment")
2    let webHook = webhookTarget("webHook")
3
4    analytics.log.addTarget(segment, forType: .history)
5    analytics.log.removeTarget("segment")
6    analytics.log.addTarget(webHook, forType: .log)
```

```
{
    "name": "Application Opened",
    "timestamp": "2021-07-12T21:01:38.969Z",
    "type": "debug",
    "function": "applicationDidFinish",
    "line": 45,
    "sender": "UIApplicationDelegate",
    "destinations": ["segment", "amplitude"],
    "details": {
        "writeKey": "8XpdAWa7qJVBJMK8V4FfXQOrnvCzu3Ie",
        "libraryName": "analytics-swift",
        "libraryVersion": "5.0.0",
        "namespace": "com.Segment.DestinationsExample"
    }
}
```

DATA LOGGING FOR API USAGE ANALYTICS

TECHNICAL FIELD

The present disclosure relates generally to systems and methods for data logging on client devices and, in one particular embodiment, data log capturing, observability, and/or metrics for one or more Application Programming Interfaces (APIs) used by a client device.

BACKGROUND

Many current logging methods for API libraries used by client devices are quite basic. For example, they may, at most, output to a local development console (e.g., in Xcode or Android Studio). While this basic logging may help with early development, it is not helpful later. For example, it cannot be used to inform decisions of whether particular aspects of an API library should be deprecated or enhanced.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 4 depicts example code for the processing of an event within the event timeline.

FIG. 5 depicts example code for how an event type is matched to an event within an event timeline.

FIG. 8 depicts an example code listing illustrating client-side functionality of the specialized data logging feature.

FIG. 10 depicts an example raw data log.

DETAILED DESCRIPTION

Figure 1:
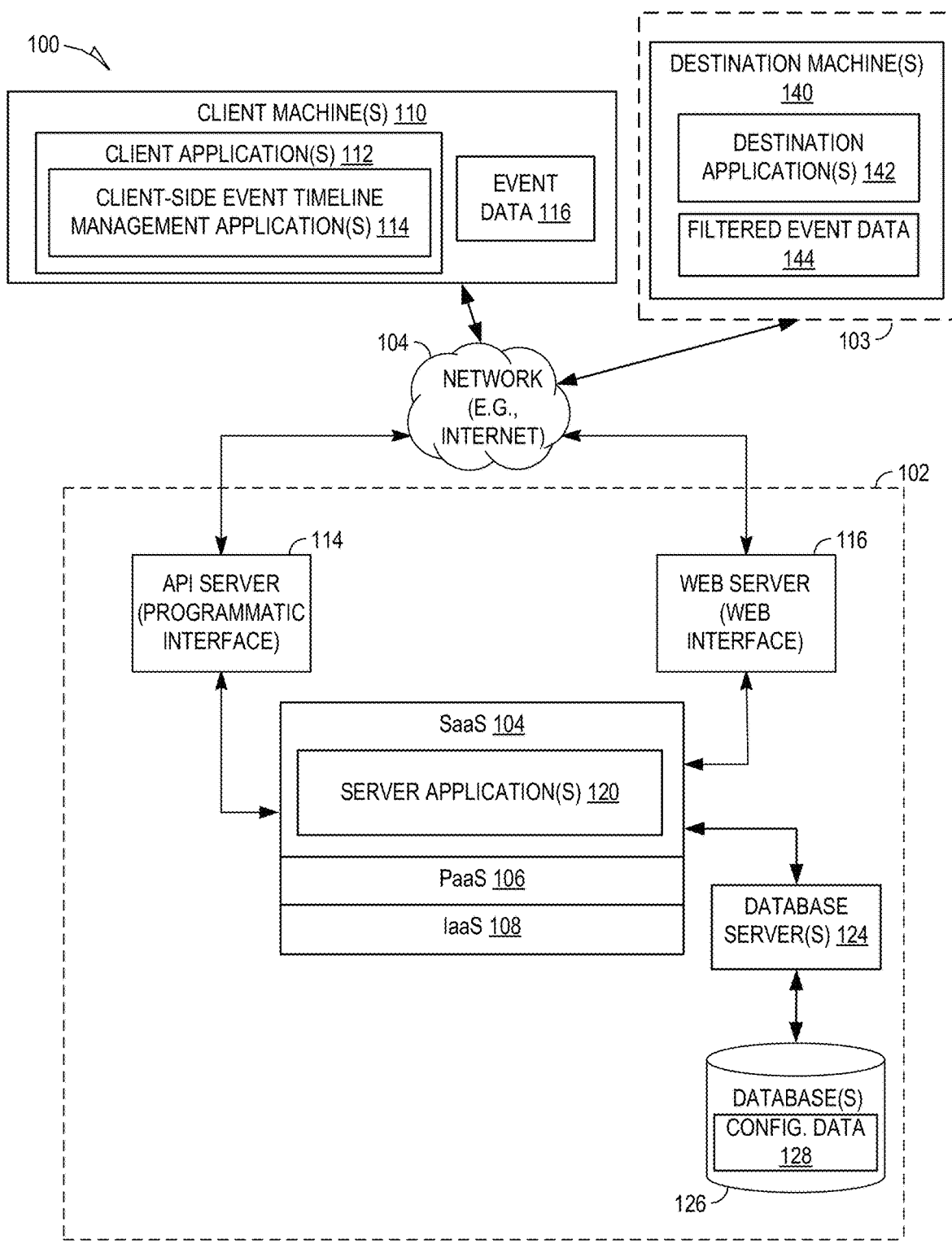
FIG. 1 is a network diagram depicting a cloud-based SaaS system within which various example embodiments may be deployed.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

In one or more embodiments, user interaction data as well as other data for production, detection, consumption, or reaction to an event is recorded on a client device in a memory allocation (e.g., of the client device), which may be a fixed-size or dynamically-sized buffer, as one or more signals to create a dataset that is used to describe an event. An event may include one or more data points from the dataset that are useful for analytics. Instrumentation code may be incorporated into an application and managed by using a management tool. Application instrumentation may be done with an approach of collection of precise data by targeting user interaction (UI) elements and sending predefined data points per interaction or with an alternative approach of collection of all UI events from clients and storage on backend analytics servers/services.

In one or more embodiments, a signal is any user interaction, storage or network call or user interface (UI) element lifecycle data point on one or more client applications, which provide data and/or metadata about the interaction. The buffer of signals may be passed through one or more pieces of logic (e.g., one or more filter functions) to qualify them as valuable data points or events instead of less relevant or irrelevant data. In one or more example embodiments, such filter functions or the middleware or edge functions described herein, may be developed outside of one or more client applications running on the client device and loaded or deployed on the one or more client applications at run-time (e.g., through over-the-air deployment) without the need to rebuild the one or more client applications.

Described are system and method embodiments for processing an event that is detected on a client device. The event is received at a first branch of an event processing timeline. Based on a matching of a first plug-in to a first stage of the first branch, the first plug-in is applied to perform initial processing of the event. Based on a matching of a second plug-in to a second stage of the first branch, the second plug-in is applied to enrich a data payload associated with the event. A second branch of the event processing timeline is created. The second branch splits the processing of the event from the first branch after the second stage of the first branch into a second branch. The second branch is associated with a destination for the event. Based on a matching of a third plug-in to a first stage of the second branch, the third plug-in is applied to perform further initial processing of the event. The further initial processing is associated with the destination for the event. Based on a matching of a fourth plug-in to a second stage of the second branch, the fourth plug-in is applied to further enrich the data payload associated with the event. The further enriching is associated with the destination for the event. Based on one or more conditions associated with the data payload being satisfied, the event is forwarded to the destination associated with the second branch.

In example embodiments, the data event is accessed by a first data stream and data analysis is performed in separate "before" and "enrichment" steps by applying specific directed modifications by use of a plug-in architecture. The data is modified according to the rules of the plug-ins. The processing of the event is split into one or more other data steams for further processing of the event. In example embodiments, the other data streams are specific to one or more respective destinations associated with the event. Each of the other data streams may include its own "before" and "enrichment" steps. The event is then optionally forwarded to one or more of the destinations based on an application of one or more rules associated with the one or more destinations. The event may be received and processed at the one or more destinations (e.g., for generation of analytics pertaining to the event). In example embodiments, each of the data streams, including the first data stream, has an "after" (or clean-up) step that, for example, deallocates or frees up memory that was allocated for the analyzing of the event data for the data stream and/or memory that is not needed for processing of event data for subsequent events detected on the client device. In example embodiments, the first data stream may perform global processing of the event data. The first data stream may or may not be associated with a specific destination.

In example embodiments, a specialized data logging feature may be enabled on a client device (e.g., via a remote switch, local switch, and/or a code switch, as described herein). In example embodiments, the specialized data logging feature may provide logging, observability, and metrics relevant to API usage on the client device. In example embodiments, the logging includes implementing developer logs centralized around debugging and live bug capturing, as described in more detail below. In example embodiments, the observability may include information pertaining to who is using the API (e.g., which applications and/or which customers of a communications platform are using the API), capturing of error/failure, warning, and/or debug statesm and/or usage of the API, including down to a granular level, such as which functions and/or which parameters of the API are being invoked, including how often they are being invoked, which destinations are being invoked, which plugins are being invoked, and/or which public API methods are being used, as described in more detail below. In example embodiments, the metrics include counters and/or gauges that provide insight into how the API is performing. For example, counters may indicate how many times a loop is executed or an event payload is changed. Gauges are similar to counters, but may be utilized around time; for example, gauges may indicate how many seconds a call to an API is taking to execute. In example embodiments, an error state includes any detrimental state that is impossible or difficult to recover from, warning states include situations where an issue can arise or should have attention drawn to it, and a debug state includes all other developer-defined or developer-centric messages.

In example embodiments, the specialized data logging feature may be configured to send information from the data logs to one or more targets. In example embodiments, this information may include pertaining to error/failure states and/or flow states.

Example targets may include a debugger (local or remote), a developer console (local or remote), and/or a flat-file on the client device. While some of the log targets may not require networking (IDE, local write, etc.), calls may be seamless for each log target that does require it. Therefore, the wheel does not need to be reinvented each time a log needs to go to a target. If authentication is required, a custom implementation may be needed to implement those specifics, but a situation where multiple networking libraries are added may be avoided.

Additionally, in example embodiments, the specialized data logging feature may be configured to separate the data logs into one or more user groups, such groups for internal developers and/or external developers.

In example embodiments, the internal developers group may focus on capturing out-in-the-wild code usage. Examples of flow states may include conditional logic or try/catch blocks (e.g., where an else or catch should never be called). For example, the data logs may indicate whether such conditional logic or catch blocks are ever hit. Thus, the specialized data logging feature may provide for proactive/automated bug hunting, such that reporting of bugs is not dependent on a manual intervention by a person who may notice the bugs and bring them to the attention of a communication platform that provides the API library to the client device.

The external developer group focus on the similar data, but less on usage of library code and more on flow states related to the calls of the library code. By using analytics logging, these calls can be quickly highlighted for out-in-the-wild applications.

In example embodiments, flow states may be related to the event data timeline. For example, the specialized data logging feature may be configured to track which destinations are used by a client device and how often each of the destinations is used, including third-party destinations that are separate from a communications platform that provides the API library.

In example embodiments, the specialized data logging feature may be configured to track whether a destination is broken (e.g., failing to send one or more acknowledgments that data has been received or providing one or more error codes).

In example embodiments, the specialized data logging feature may be configured to provide tracing of one or more events within a set of events. For example, the specialized data logging feature may be configured to determine if and when functions are called at each stage of the event data processing timeline, including which parameters of those functions are called. Additionally, the specialized data logging feature may be configured to track if and when any changes are made to an event or its payload (or to a copy of the event or a copy of its event payload), including from the beginning of the processing of the event until the end of the processing of the event, including for each branch of the event processing and/or for each stage within each branch.

In example embodiments, logs generated by the specialized data logging feature may not be handled independently of live events in the system. In other words, storing, reporting, or delivering of logs may not require waiting for an event to come through the system. For example, logs may be generated or delivered based on execution other aspects of the client device that do not relate to events, such as execution of plugins (e.g., utility plugins) or other systems, such as storage systems, which may not even be configured to trigger any events. Thus, for example, targets, including remote targets, may be selected for receiving log data, including log data pertaining to one or more events, independently of whether such events are actually delivered to a destination via the event data timeline.

In example embodiments, systems, methods, and computer-readable storage mediums for performing specialized data logging on a client device are disclosed. Observability data pertaining to an API on a client device is captured. The observability includes, for each of one or more functions of the API, a number of times the function is used and a number of times each parameter of the function is used. The observability data pertaining to the API is communicated to a target based on a type of the observability data.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples provided herein are provided by way of illustration and under specific conditions using a specific embodiment or embodiments; accordingly, neither these examples nor their implementations shall be used to limit the scope of the disclosure of the current patent document.

It shall also be noted that although embodiments described herein may be within the context of client-side enrichment and transform, aspects of the present disclosure are not so limited. Accordingly, the aspects of the present disclosure may be applied or adapted for use in other contexts.

FIG. 1 is a network diagram depicting an example system 100 within which various example embodiments may be deployed. One or more client machine(s) 110 may be communicatively coupled (e.g., via one or more network(s) 104) to one or more networked systems, such as networked system 102 or networked system 103. Each of the one or more client machine(s) 110 may execute on or more client application(s) 112. Examples of client application(s) 112 include one or more client-side event timeline management application(s) that are configured to, for example, detect and process events on the client machine, allocate or deallocate computing resources related to such event detection and processing, and so on, as discussed in more detail below. For example, the client application(s) may allocate or deallocate memory for event data 116 corresponding to events detected on the device, processing resources for processing or analyzing the event data, and communication resources (e.g., bandwidth) for receiving or transmitting the event data. Other examples of client application(s) 112 may include a web browser application, such as the Internet Explorer browser developed by Microsoft Corporation of Redmond, Washington or other applications supported by an operating system of the device, such as applications supported by Windows, iOS or Android operating systems. Each of the client application(s) 112 may include one or more software application modules (e.g., a plug-in, add-in, or macro) that adds a specific service or feature to the application.

One or more of networked systems 102 or 103 may take the example form of a cloud computing service, such as Amazon Web Services (AWS), Microsoft Azure, or other cloud service and may provide server-side functionality, via a network 104 (e.g., the Internet or Wide Area Network (WAN)) to one or more endpoints (e.g., client machines 110). FIG. 1 illustrates client application(s) 112 on the client machines 110. In example embodiments, networked system 103 includes one or more destination machine(s) 140. The one or more destination machine(s) 140 may executed one or more destination application(s) 142 that are configured to, for example, receive and analyze event data received from the one or more client machine(s) 110 and communicate results of the analysis to the one or more client application(s) 112 or the one or more server application(s) 120. In example embodiments, the one or more destination machine(s) 140 operated on filtered event data 144 that is received from the client application(s) 114, as described in more detail below. Examples of the destination application(s) 142 may include a customer data platform or analytics system, such as Segment, Amplitude, Mixpanel, Google Analytics, and so on.

In example embodiments, the networked system 102 includes one or more server application(s) 120 that are configured to, for example, receive communications from the one or more client application(s) 112 or the one or more destination application(s) 142. In example embodiments, communications received from the one or more client application(s) 112 may include information useful for identifying types of devices of the one or more client machine(s), such as operating systems deployed on the one or more client machine(s), features supported by the one or more client machine(s), or computing resources available to the one or more client machine(s). Communications may also include information pertaining to detection of events on the client machine(s) 110, including some or all of event data 116. This information may then be processed and used by the server application(s) 120 to, for example, create, update, or remove data items stored in configuration data 128. In example embodiments, the configuration data may include rules included in one or more plug-ins that are installed on the one or more client machine(s) 110.

Communications received from the destination application(s) 142 may include information pertaining to processing of the filtered event data 144, such as, for example, identification of one or more customer groups into which the client machine(s) 110 may be categorized.

The one or more server application(s) may perform one or more operations to, for example, configure the one or more client application(s) 112 or the one or more destination application(s) 142. For example, the one or more server application(s) may select one or more plug-ins (e.g., from configuration data 128) for deployment on the one or more client machine(s) 112 (e.g., based on the identified types of the one or more client machine(s) 110). In example embodiments, the one or more server application(s) 110 may customize instructions included in the plug-ins based on the one or more communications received from the client machine(s) 110 or the destination machine(s) 140 (e.g., based on information pertaining to the efficiency with which events are being processed on the client machines or based on the types of output that the one or more server applications desire to receive from the destination applications 142).

Each of networked systems 102 or 103 may include an Application Programming Interface (API) server (e.g., API server 114) or a web server (e.g., web server 116), which may be coupled to, and provide programmatic and web interfaces respectively to, one or more software services, which may be hosted on a software-as-a-service (SaaS) layer or platform (e.g., SaaS platform 104). The SaaS platform may be part of a service-oriented architecture, being stacked upon a platform-as-a-service (PaaS) layer (e.g., PaaS layer 106) which, may be, in turn, stacked upon a infrastructure-as-a-service (IaaS) layer (e.g., IaaS layer 108) (e.g., in accordance with standards defined by the National Institute of Standards and Technology (NIST)).

While the server applications 120 are shown in FIG. 1 to form part of the networked system 102, in alternative embodiments, the server applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs.

One or more of the client applications 112 executing on the client machine(s) 110 may access the various server applications 120 or destination applications 142 (e.g., via an interface supported by a server, such as web server, or an API supported by an API server, such as API server 114). For example, third-party applications executing on the client machine(s) 110 may access one or more features or functions on a website hosted by the third party, such as those provided by destination application(s) 142 or server application(s) 120 using interfaces or APIs.

The server applications 120 or destination applications 142 may be hosted on dedicated or shared server machines (not shown) that are communicatively coupled to enable communications between server machines. The server applications 120 or destination application(s) 142 themselves may be communicatively coupled (e.g., via appropriate interfaces) to each other and to various data sources, so as to allow information to be passed between the server applications 120 and destination application(s) 142 and so as to allow the server applications 120 and destination application(s) 142 to share and access common data. The server applications 120 or destination application(s) 142 may furthermore access one or more databases (e.g., database(s) 126) via one or more database servers (e.g., database server(s) 124). In various example embodiments, various data items are stored in the database(s), such as configuration data 128 or filtered event data 144.

Figure 2:
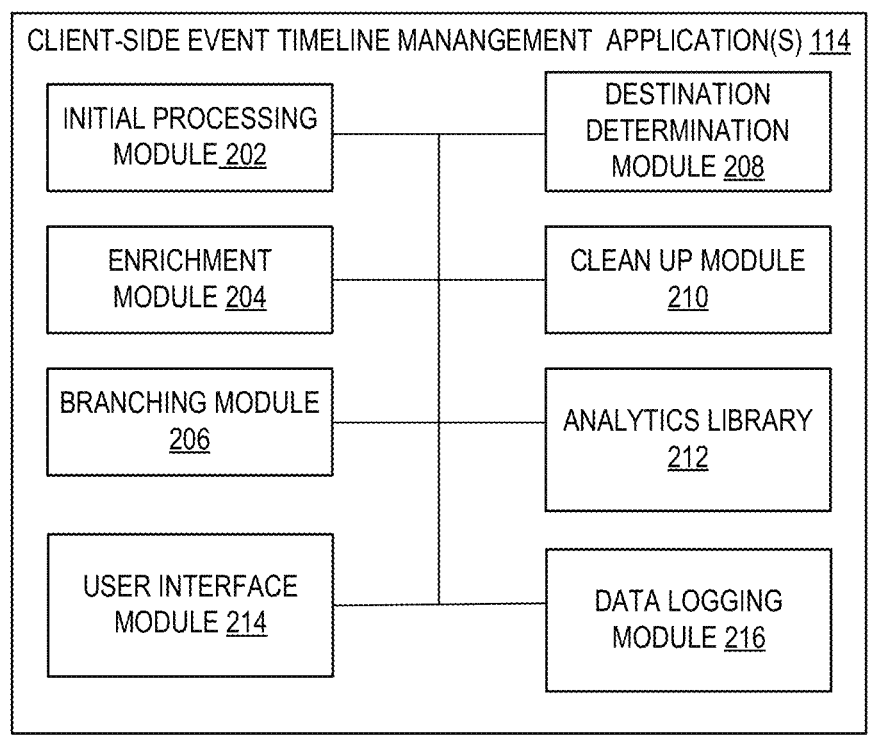
FIG. 2 is a block diagram illustrating example modules of the event timeline management applications of FIG. 1.

FIG. 2 is a block diagram illustrating example modules of the client applications 114. An initial processing module 202 is configured apply one or more plug-ins that are meant to perform an initial or "before" modifications or processing to the event data. In some examples this can include adding identification information or web page information to the event data. The initial processing module can utilize an analytics library 212 to use a plug-in or multiple plug-ins for the before processing step based on the requirements for that would be needed by later steps of the event timeline such as the enrichment module 204. An enrichment module 204 is configured to perform and "enrichment" step. This may include such steps as analyzing and processing to the event data to either add, strip, or modify the event data to allow a later destination for the data to use the event data more efficiently in further steps for later analysis or use by the system. For example, during the enrichment step, a plug-in may anonymize the event data. For example, the plug-in may strip personally-identifiable information or other sensitive information (e.g., bank account numbers, credit card numbers, driver's license numbers, social security numbers, and so on) from the event data. The enrichment module can also pull features needed for the enrichment from the analytics library 212. In example embodiments, the branching module 206 is configured to send a copy of the event data separate branch of the event timeline (e.g., based on determining if the data require further enrichment before being sent to a destination). A destination determination module 208 is configured to determine where the destination for the data of the different branches of the data even timeline should be sent and to send the data of the data event timeline to those destination or destination once the data of the event has finished enrichment within the enrichment module. A clean-up module 210 is configured to perform and "after" step. The "after" step may include a clean-up to the event data after it has an arrived at the destination but before the destination actively uses the data. In example embodiments, the "after" step may include a notification that the event data was sent or successfully delivered to the destination or notification of an error (e.g., including an error code) in the sending or delivery of the event data to the destination. In example embodiments, the system may keep metrics around deliverability (e.g., based on results generated during the "after" step). For example, the system may track metrics such as how many calls were made to a particular destination, how many calls to the destination were successful, or how many calls to the destination failed. A user interface module 214 is configured to present one or more user interfaces, such as a console user interface, on the client device. A data logging module 216 is configured to implement a specialized client-side data logging feature, as described in more detail below.

Figure 3:
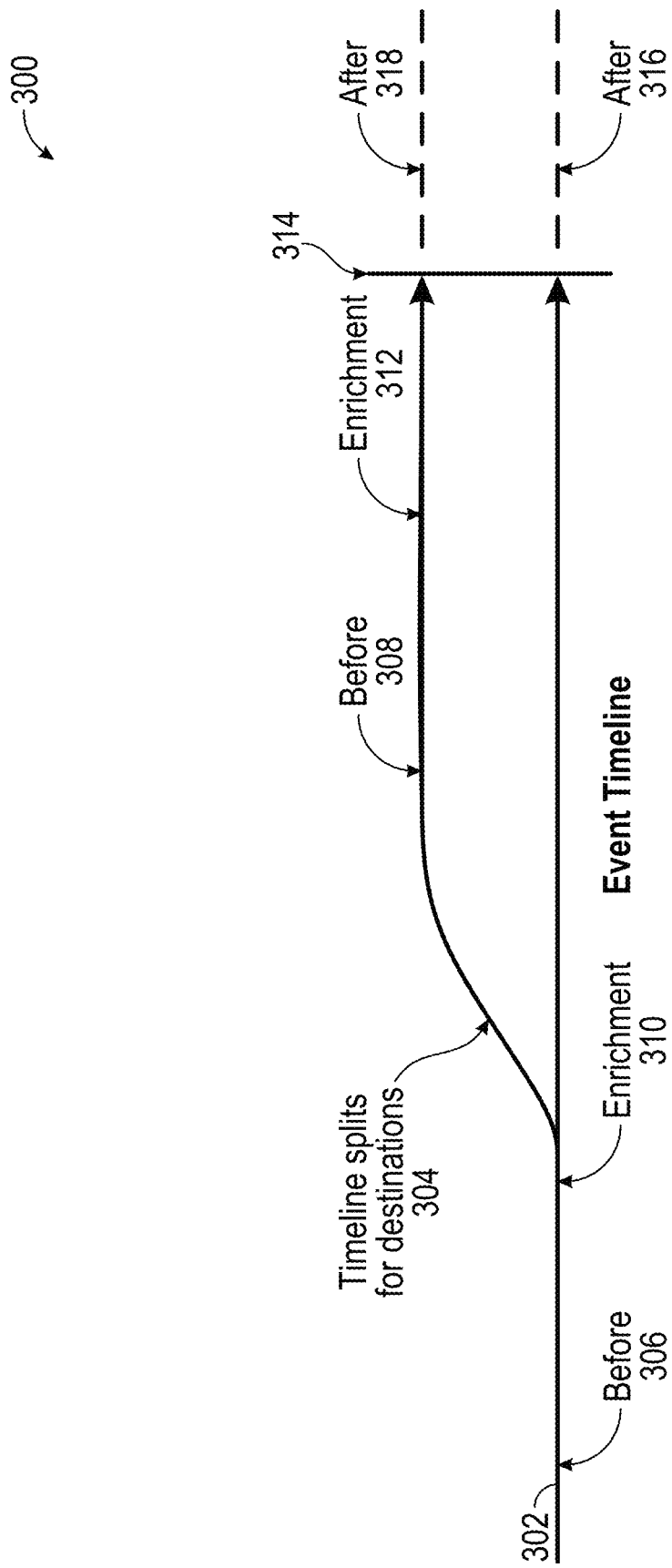
FIG. 3 depicts a method of dynamic analytics using an event timeline for event processing.

FIG. 3 depicts an example event processing timeline 300. The event processing timeline may include a plurality of branches, such as a first branch 302 and a second branch 304. Other branches may be a part of the event timeline but are not depicted in FIG. 3. Each of the plurality of branches are configured to be associated with one or more of a "before" plug-in (i.e., before plug-in 306 or 308), an "enrichment" plug-in (e.g., the enrichment plug-in 310 or 312), or an "after" plug-in (e.g., the "after" plug-in 316 or 318).

The first branch 302 may act as source branch for data events with the event timeline. Global data manipulation can occur at the first branch 302 before data events are pushed to other branches, such as the second branch 304 and/or the third branch (not depicted). The third branch may stem from the first branch or the second branch. In some example embodiments, the other branches act as "destination branches" wherein the data manipulation for the data event is specific to a particular destination for the data event. Processing of the event within each of the branches is independent of the processing of the event within each of the other branches. For example, data manipulation that occurs in the second branch 304 does not affect the data of the event in the first branch 302. And data manipulation that occurs in the first branch 302 (after the splitting of the second branch 304 from the first branch 302) does not affect the data of the event in the second branch. Thus, in example embodiments, event data may be simultaneously processed for multiple destinations using data that is customized for each destination, which can lead to faster event processing times.

The before plug-in 306 can be used to perform different actions on the data. For example, in some cases the before plug-in 306 can be used for determining a data type for use in further processing, or for determining user consent and permission for the use of the data collected by the data event. The before plug-in 306 can be used for determining and labeling type information and other identification data at the first data branch. In some examples, identification information can be appended to the data at the before plug-in 306 prior to reaching enrichment. In other examples timestamp data and other initial properties from the source may be appended to the event data before it reaches the enrichment plug-in 310.

The enrichment plug-in 310 can transform and/or enrich the event data event by, for example, adding event data that is specific to a particular source or a particular destination. In example embodiments, the plug-in may be configured to call one or more edge functions, such as edge functions provided by the server application(s) 120 or the destination application(s) 142. In example embodiments, an edge function may include a piece of customer logic written in a programming language, e.g., JavaScript, which is implemented to enrich or transform one or more events, wherein event enrichment may be referred as logic to append additional data points to an event and event transformation may be referred as logic to change one or more keys or values for a given event. In example embodiments, an edge function may be developed outside the client application and deployed over-the-air. In one or more embodiments, over-the-air deployment incorporates an infrastructure and product architecture that is designed to enable deployment of additional logic to client applications operating on one or more platforms. An event may include one or more data points for analytics. Event enrichment can be performed on the client side within the first branch 302 to the source data. The client-side can have a browser application console comprising a code editor and a debugger. The code editor provides an online text editor to allow customer code, e.g., custom JavaScript snippets, to be written. In one or more embodiments, the customer code may be written as one or more edge functions. This infrastructure enables a scenario where new logic is loaded by a client application on load without the need for a rebuild of the entire application. In one or more embodiments, an edge function may be a source edge function (also known as source customer logic) or a destination edge function (also known as destination customer logic). The plug-in architecture includes infrastructure designed to run inside the client applications which ensures that a single piece of logic written in in a programming language, e.g., JavaScript, may be executed in one or more platforms.

The event is split from the source or first branch 302 to a destination branch, such as the second branch 304, after the enrichment step of the first branch (e.g., after application of the enrichment plug-in 310). The second branch 304 can take the data that was enriched within the enrichment step 310 and apply further processing, depending on what may be needed for processing and analyzing the event data within the second branch. The before plug-in 308 can also be used for applying specific actions and modifications to the data based on the destination before the data reaches the enrichment 312 step. In example embodiments, when the event data reaches the enrichment plug-in 312, can use middleware or edge functions, including source edge functions and/or destination edge functions specific to the destination associated with the second branch may be used to transform and/or enrich the event data for the event. In example embodiments, the plug-ins may be implemented or supported by middleware that is built into the analytics library 212 (e.g., to allow hooking of custom logic in a language native to the platforms of each client device). In example embodiments, the edge functions perform serverless functions in response to events on the client device with no need to involve server applications, such as server applications 120 or 142.

In some embodiments, the processed data event might be held at its current branch and not sent to a destination branch or it might be sent at later time after further data events have been processed by the source branch. After the enrichment step a determination can be made not to forward the event to one or more destination. If the data is not forwarded after the enrichment step, it may be forward at a later time or once more data is enriched and ready to be sent to the destination for further processing. This allows for standardization as the data is not sent to the server side in an ad hoc fashion when it may be unable to be appended to relevant data event if new data come in at a later point. This increases the efficiency of the data processing. There are clear points of entry for edge functions or middleware to be executed in the data timeline. The standardization of the data within the data event may in some instances reduce the amount of bandwidth used for communication with the destination.

For example, an enrichment might be that the identity of the user will be written to a plug-in but only if the identity of the user changes from the default user. Otherwise, the identity might be stripped from the data event and not sent to further destination branches.

Another example of enrichment is that personally identifiable information of the client is striped from the data event at first branch 302 before being sent to the destination branches 304 and 306 for further processing. Before the second or third branch 304 or 306 respectively send the data to the intended destination the data further personal identification can be strip from the data to anonymize the data further.

In a further example of enrichment in some case new data can actually be appended or added to the data event such as specific page information that contextualized the event data when used at the destination.

Another example of enrichment can be the collection of error logs that are collected and sent to a destination upon a particular instruction from the client or pre-determined trigger event.

After the data is pushed from the various one or more branches to a destination 314, there is an after plug-in 316 and 318, wherein clean-up of the data pushed from the various branches of the event timeline are cleaned up prior to use by the destination. The after plug-in can be decoupled from the before and enrichment plug-ins that came before it. The after plug can determine different data type information if needed and can be versioned for customer specific use.

Plug-ins allow the core data flow to remain intact and helps developers keep the code simple. Features for data processing can be easily added. And testing can be done on the plug-in instead of the entire system making implementation of futures plug-in easier to be used within the system as the whole system does need new testing upon adding new features. This provides standardization for where and when different stages of event processing occur.

A library of plugins is integrated by a developer into one or more client applications and instrumentation code is added across one or more client applications. In one or more embodiments, the developer may access a developer console (e.g., a browser application) and develop various enrichment and transformation logic in a developer console. In one or more embodiments, the development of various enrichment and transformation logic comprises first creating the enrichment and transformation logic, e.g., by using JavaScript inside the code editor in the client-side console; debugging the created logic using the debugger in the client-side console; and loading the debugged logic into the server. In one or more embodiments, the enrichment and transformation logic may also be created in a client's own coding environment and be pushed to the server-side console via an API. In one or more embodiments, once a piece of logic is finalized or ready to be loaded into the server, it is configured to run as either source or destination edge function. In one or more embodiments, the logic is loaded in the backend server along with its configuration as source or destination edge function. In one or more embodiments, each piece of logic is run through various performance and security tests and is available for client applications to fetch on load.

It shall be noted that the examples and processes are provided by way of illustration and were performed under specific conditions using a specific embodiment or embodiments; accordingly, neither these examples nor their processes shall be used to limit the scope of the disclosure of the current patent document.

FIG. 4 depicts example code for the processing of the event within the event timeline. An incoming event is detected (e.g., a process function is called). After an event arrives, any plug-ins matching the "before" type may be applied. For example, an applyPlugins function may be called. A type corresponding to the "before" step (e.g., ".before") may be provided as a first parameter and a reference to the incoming event is provided as a second parameter. This may be done by the initial processing module 202. Then any plug-ins matching the enrichment type may be applied. For example, the applyPlugins function may be called again. A type corresponding to the "enrichment" step (e.g., ".enrichment") may be provided as the first parameter and a reference to a result (e.g., "beforeResult") of a previous call to the applyPlugins function may be provided as a second parameter. This might be done by the enrichment module 204. In some examples the enrichment is sourced by middleware used by the system in order to analyze event data. In some cases, the event data may not be sent forward to the destination and the stagnation of the data occurs, if required. Determination of whether the data should be stagnated or forwarded to a different branch may be done by the destination determination module 208. In some examples, the data is sent to the destination branch. For example, the applyPlugins function may be called again. A type corresponding to the "destination" step (e.g., ".destination) may be passed as the first parameter and a reference to the result (e.g., "enrichmentResult") of the previous call to the applyPlugins function may be provided as the second parameter. This might be performed by the branching module 206. In example embodiments, at this step, a plug-in may be executed to determine whether to split the event from its original timeline branch (e.g., based on a determined destination for data corresponding to the event). In example embodiments, the applyPlugins function does not provide a return value for plug-ins of the "destination" type because, for example, further processing may occur in a separate processing branch or at a destination server from which results may be separately obtained. In example embodiments, for an event that is split from its incoming timeline branch, the process function may be called again with respect to its new timeline branch, triggering the application of any plug-ins relevant to its new timeline branch. Thus, separate, concurrent processing of the event data will occur with respect to the new timeline branch. In example embodiments, the destination plug-in may include logic for determining whether to proceed with sending the event to the destination. Thus, for example, calls to a destination that are determined to be redundant (e.g., in view of data received during the before and enrichment steps) may be filtered out before the event data is forwarded to the destination, thus improving the efficiency or speed of the system (e.g., by reducing computing resources, including processing power, memory, or bandwidth required to process the event), For example, suppose an event will trigger a call on the destination side to obtain additional data, such as, for example, a user identifier. If it is determined that the user identifier has already been added to the event data (e.g., based on calls to the before or enrichment plug-ins), this event may be filtered out before it is sent to the destination. Next, the "after" plug-ins may be applied (e.g., for clean-up of the data within the event timeline). For example, the applyPlugins function may be called again. A type corresponding to the "after" step (e.g., "after") may be provided as the first parameter and a reference to the result (e.g., "enrichmentResult") of a previous call to the applyPlugins function may be provided as a second parameter. This may be done by the clean-up module 210. The result (e.g., "afterResult) of the processing of the incoming event is then returned to the caller of the process function. This ordered processing of incoming events provides standardized points of entry for interested parties to modify the event data as it travels from entry into the system through departure from the system, providing for more efficient processing and more predictable results.

By use of specific plug-in system for matching the event type with the event enrichment data can be passed out when appropriate and the system maintains a core logic in a single place. In some examples specific programs, such as Segment by Twilio, Foundation by Twiliio, or UlKit by Twilio may be uploaded or imported in whole or part in order to allow access to the plug ins that the user may wish to use for the purposes of data analysis or modification based on the event detected by the system. For example, a branched destination which is interested in sending an alarm or signal to the user when a new or different user is accessing a website may wish to know when the identity of a user is changed. The client-side system may periodically check that the user is the same and so long as the user identity is not changed the data is not passed out of branch to the destination. However, upon change of the user identity the data can then be passed to the destination alarm platform to act upon the change of user.

FIG. 5 depicts example code for a screen tracking plugin. In example embodiments, the plugin may be one of multiple plugins stored in an examples repository. In example embodiments, interested parties may access the examples repository to, for example, download default versions of the plugins or collaborate with other parties to fix bugs or improve the plugins. For example, the screen tracking plugin may be downloaded from the code repository, modified, and then provided as a plugin that is to be invoked within the event data processing timeline. For example, the screen tracking plugin, as shown, may be modified to, for example, use only the screen title when generating analytics pertaining to screen tracking. In this, case the default screen tracking plugin can be modified to remove analytics pertaining to a class of the screen and then provided (e.g., as a "before" plugin) for use in the event data processing timeline.

Figure 6:
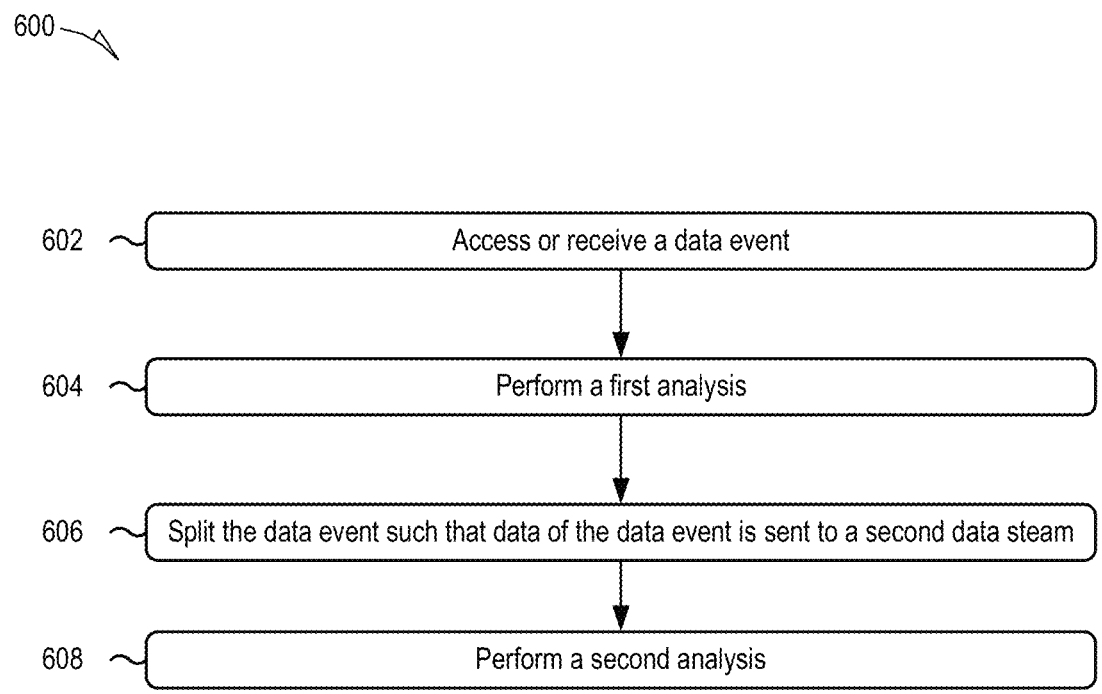
FIG. 6 depicts a flow diagram of an example method of dynamic analytics using an event timeline for event processing.

FIG. 6 depicts a flow diagram of an example method 600 of dynamic analytics using an event timeline for event processing. In example embodiments, the operations of the method 600 are performed by one or more of the modules of FIG. 4.

At operation 602 a data event is received or accessed. Accessing a data event may be done by a first data stream by the branching module 206 and/or the initial processing module 202.

At operation 604 a first analysis is performed. The first analysis comprises one or more of applying a first modification (e.g., for initial processing of the event data) and applying a second modification (e.g., for enrichment of the event data). The first modification may implement a first data modification rule (e.g., as defined by a first plug-in). The second modification may implement a first data enrichment rule (e.g., as defined by a second plug-in). This may be done by the initial processing module 202 or the enrichment module 204 respectively.

At operation 606, the data event is split such that data of the data event is sent to a second data steam. This process may be done by the branching module 206. In some example embodiments, the destination determination module 208 may push forward the data from the data event after being modified by the different plug ins to the second data stream.

At operation 608, a second analysis is performed. The second analysis in some example embodiments comprises applying a third modification (e.g., for initial processing of the event data that is specific to a destination associated with the second data stream) and/or a fourth modification (for enrichment of the event data that is specific to the destination associated with the second data stream). The third modification may implement a second data modification rule. The fourth modification may implement a second data enrichment rule. The second analysis may be performed by the initial processing module 202 or the enrichment module 204 respectively.

The data can be processed on the client device before being sent to a destination on an outside server for further data analysis and processing (e.g., by the destination determination module 208). For example, the data collected can be specifically about user interaction data from the client device to help form a complete customer profile or integrate customer data into the event data. Other examples may include data collected from applications such as Segment developed by Twilio or other applications. In another example, analytics of interaction behavior can be used to determine best processes for user engagement or retention. This may include using application such as Amplitude by Twilio. After a second analysis further clean-up of the data event (e.g., based on the one or more conditions of a destination of the data event) can occur by the clean-up module 210. Or in some cases the data can be held or dumped without sending to a destination after the analysis by the destination determination module 208. In some examples, the data will not be forwarded to a destination unless there is a monitored change in the data that is noted by the event system or one or more other pre-defined criteria is met, such as criteria controlling bandwidth usage of the client device. In some examples, the splitting of the event among multiple different data streams (e.g., by the branching module 206) allows for parallel processing and analysis (e.g., specific to different destinations associated with each data stream), as described herein.

Figure 7:
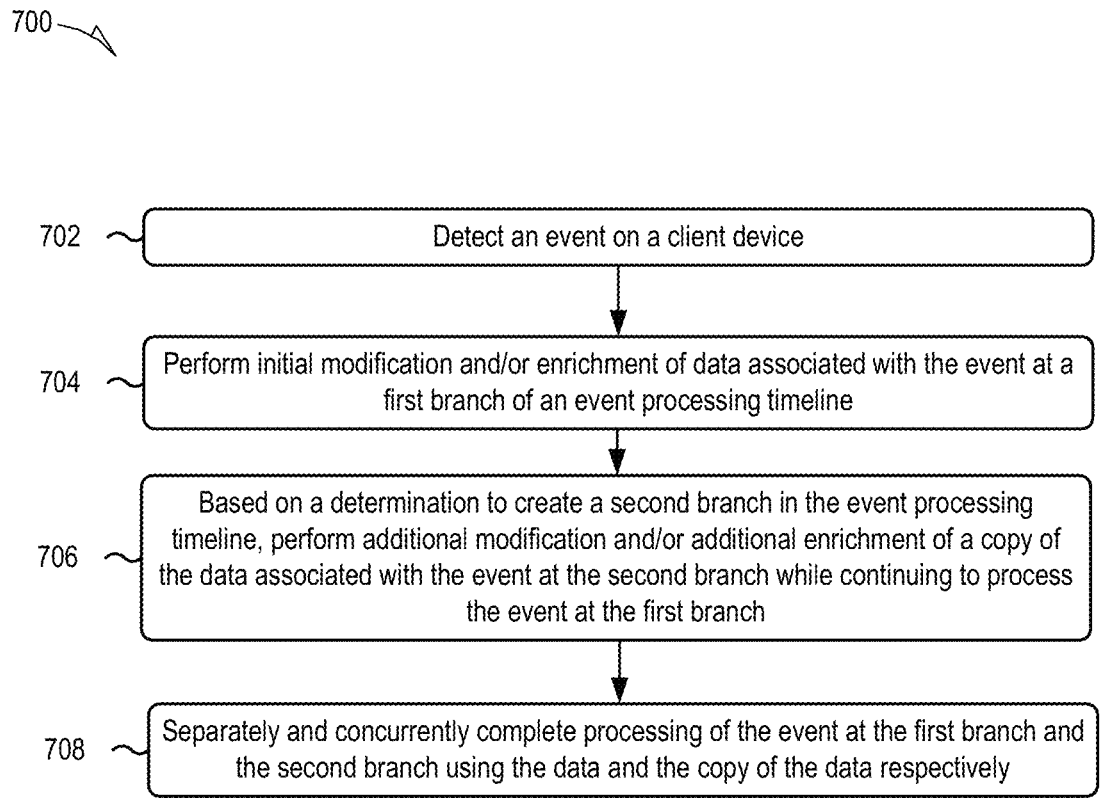
FIG. 7 depicts a flow diagram of an example method of processing an event on a client device.

FIG. 7 depicts a flow diagram of an example method 700 of processing an event on a client device. In example embodiments, the operations of method 700 are performed by one or more of the modules of FIG. 2.

At operation 702, an event is detected on a client device. In example embodiments, the event may be defined by event detection logic that is installed on the device. For example, the event detection logic may be provided by an administrator of the device.

At operation 704, event data associated with the event is received and analyzed at a first branch of an event processing timeline corresponding to the event. In example embodiments, the event data is provided to one or more plugins corresponding to a "before" step. The one or more "before" plugins may perform pre-processing of the data, which may include adding user identifiers to the event data or performing any of the other pre-processing steps described herein. The event data may be provided to one or more plugins corresponding to an "enrichment" step. The one or more "enrichment" plugins may add, modify, or strip parts of the event data, as described herein.

At operation 706, a determination may be made to create a second branch in the event processing timeline corresponding to the event. For example, a second branch may be created based on a destination that is associated with the event. A copy of the event data may be provided for processing of the event in the second branch such that processing of the event in the second branch does not affect processing of the event in the first branch. At the second branch, the copy of the event data is received and analyzed. In example embodiments, the copy of the event data is provided to one or more plugins corresponding to a "before" step for the destination. The one or more "before" plugins may perform pre-processing of the copy of the data, which may include adding user identifiers to the copy of the event data or performing any of the other pre-processing steps described herein. The copy of the event data may be provided to one or more plugins corresponding to an "enrichment" step for the destination. The one or more "enrichment" plugins may add, modify, or strip parts of the copy of the event data, as described herein. The processing of the event on the second branch may be performed separately and concurrently with the processing of the event on the first branch. While not depicted in FIG. 7, additional determinations may be made to create additional branches in the event processing timeline corresponding to the event (e.g., to handle processing of the event for multiple destinations simultaneously).

At operation 708, the event is processed separately and concurrently at each of the branches, wherein each branch uses a separate copy of the event data is it was received from the previous branch(es). Thus, each branch may adapt its copy of the event data in the most appropriate way for the destination to which it is intended. Additionally, the event may be filtered prior to sending to each destination based on rules specific to each destination, as described herein. The event may undergo a post-processing step for cleaning up the event data and its copies, as well as for tracking delivery metrics, as discussed herein.

FIG. 8 depicts an example code listing 800 illustrating client-side functionality of the specialized data logging feature. In example embodiments, the specialized data logging feature may be implemented by the data logging module 216. In example embodiments, one or more client-side APIs and/or one or more API libraries are provided (e.g., by a communications platform, such as system 102) and used by the client device.

In example embodiments, the APIs may include a function (e.g., "analytics.log( )") for a generic public logging method. This function may be split into three methods: log( ), metrics( ) and history( ). Each method may have associated data such as writeKey, libraryName, libraryVersion and namespace. More or specific data may be added for certain log types. In example embodiments, the specific data may be the same as or a subset of information that is associated with an event.

In example embodiments, the APIs may include public methods and private methods. In example embodiments, the public methods may be enabled or disabled via a user interface (e.g., a local and/or a remote Web UI switch) or a code switch.

In example embodiments, the public methods may include a log function/method (e.g., "log(message: String, kind: LogKind")) In example embodiments, the log function signature may have one or more (e.g., two) parameters, such as "message" and the "kind". The message may be a string that encapsulates the message to be logged. Kind may encapsulate a type of the message (e.g., error, warning, or debug). A timestamp may be generated by the log method itself.

In example embodiments, the public methods may include a metric function/method (e.g., "metric(type: MetricType, name: String, value: Double, tags: [String]") In example embodiments, this metric function signature may have one or more (e.g., four) parameters, such as type, name, value, and tags. The type may be ".gauge" or ".counter." Name may be the title of the metric. Value may be the value of the gauge or counter. Tags may be an optional array of strings associated with the metric. In example embodiments, the timestamp may be generated by the metric method itself.

In example embodiments, the public methods may include a history function/method (e.g., "history(event: RawEvent, sender: AnyObject, function: String=#function"). In example embodiments, this history function may be for capturing an event and the changes the event goes through. In example embodiments, the history function keeps track of hashed (e.g., messageId+timestamp) events until sent. The function may start with the original event and then, when a delta is sent in, the change will be captured along with where it came from. This aggregated history can then be sent out (e.g., in JSON) to illustrate the history. This history function may have two required functions/methods—one for the original or updated event coming in and one for the object that called this API function/method. There may be a default parameter for the function this was called from.

In example embodiments, the private methods may include an internal log function/method (e.g., "segmentLog (message: String, kind: LogKind"). In example embodiments, this internal log function signature has two parameters: the message string and the kind. In example embodiments, the message encapsulates the message to be logged. In example embodiments, the kind will encapsulate error, warning, and/or debug information. In example embodiments, the timestamp will be generated by the internal log method itself.

In example embodiments, the private methods may include an internal metric function/method (e.g., "segmentMetric(type: MetricType, name: String, value: Double, tags: [String]") In example embodiments, this internal metric method signature has one or more (e.g., four) parameters. The type may be ".gauge" or ".counter". Name may be the title of the metric. Value may be the timed gauge or counter value. Tags may be an optional array of strings. In example embodiments, the timestamp is generated by the metric method itself.

As shown in FIG. 8, Each of the logging API methods will have targets attached to them. This helps determine where a log should go, such as to a console (local or remote), a debugger (e.g., local or remote), and/or third party. It is possible to have multiple targets.

In example embodiments, logging is not absolutely require (e.g., with a possible exception being for system types). In example embodiments, the types help filter analytics on how the system is being utilized. In example embodiments, logging is performed on an opt-in basis (e.g., based on one or more local, remote, and/or code switches). In example embodiments, this prevents from too much of a build-up of local logs and also takes privacy into account. Certain features, such as API usage and capturing details around client-side destination usage, may be considered opt-out or not able to be disabled at all. While there may be a feature switch for complete control, there may be a local switch to override the remote switch. For example, this could be useful in #ifdef DEBUG situations.

Figure 9:
FIG. 9 depicts an example user interface for configuring the specialized data logging feature.

FIG. 9 depicts an example user interface 900 for configuring the specialized data logging feature. In example embodiments, the user interface may be implemented on the client device by the user interface module 214. In example embodiments, the user interface may be implemented and/or presented remotely (e.g., as an administrative user interface, or Web UI or webapp, of the system 102 or a third-party system, such as one or more of destination machine(s) 140).

In example embodiments, to access logs, a user may go to the webapp under the appropriate Source (e.g., "Segment IOS Example Application"). For example, the Logs may be accessible via a tab in the UI.

In example embodiments, each log is listed with a title and a timestamp indicating the log was executed. A type of the log may be indicated as well, possibly by color or icon. In example embodiments, all logs (with a possible exception of a history log) are associated with a raw log (e.g., JSON) listing. For a history log, each event before a change may be listed along with information pertaining to the change.

In example embodiments, a Sources UI may include a toggle switch to enable or disable logging. In addition, the UI may present live logs in real-time and include a switch for pausing or resuming this presentation.

In example embodiments, the presentation of live logs in the UI may be disabled via a local switch or a code switch.

In example embodiments, the UI includes tracked data pertaining to the usage of each API at a granular level across one or more applications deployed on the client device, including how often each method/function is called, how often each parameter is used, ranges of values used for each parameter, how long each function takes to execute, and so on, including data configured to be tracked with gauges and counters.

In example embodiments, the UI may expose network stack information for each logging target. In example embodiments, data is cached for off-device logging targets. The exact sizing to cache and page may be configurable based on each endpoint. For example, for the logging API, a 500k batch and 32k max "event" size may be used.

FIG. 10 depicts an example raw data log 1000. The raw log may include a name, timestamp, type, function, line number, sender, destination(s), and/or detail(s). In example embodiments, the detail(s) may include writeKey, libraryName, library Version, and/or namespace.

In example embodiments, a user may configure the specialized data logging feature by, for example, calling an appropriate logger API method from an application and adding the target for each type.

Figure 11:
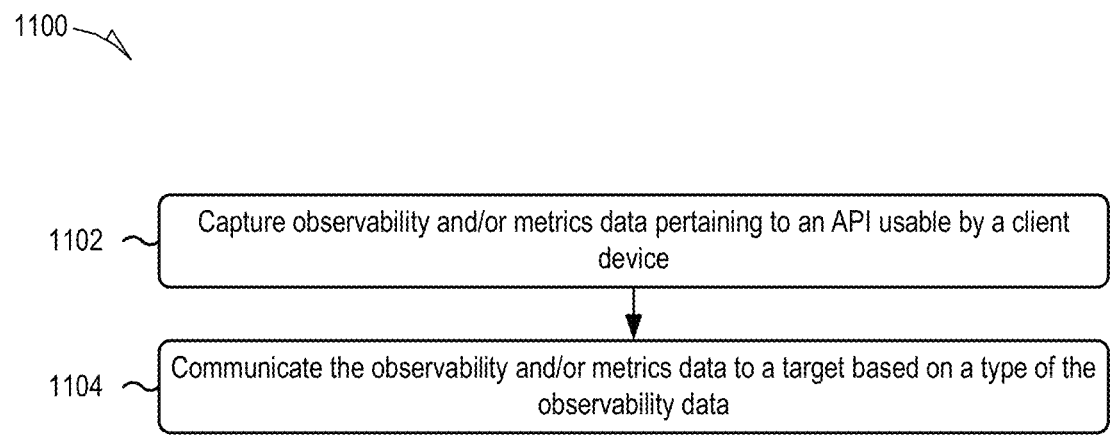
FIG. 11 is a flowchart of an example method for implementing a specialized data logging feature on a client device.

FIG. 11 is a flowchart of an example method 1100 for implementing a specialized data logging feature on a client device. In example embodiments, the example method 1100 may be implemented by the data logging module 216 of FIG. 2.

At operation 1102, observability data and/or metrics data pertaining to an API usable by a client device is captured on the client device, as described above.

At operation 1104, the observability and/or metrics data is communicated to a target, as described above. In example embodiments, the communicating of the observability and/or metrics data is communicated to the target based on a type of the observability data, as described above.

Example Mobile Device

Figure 12:
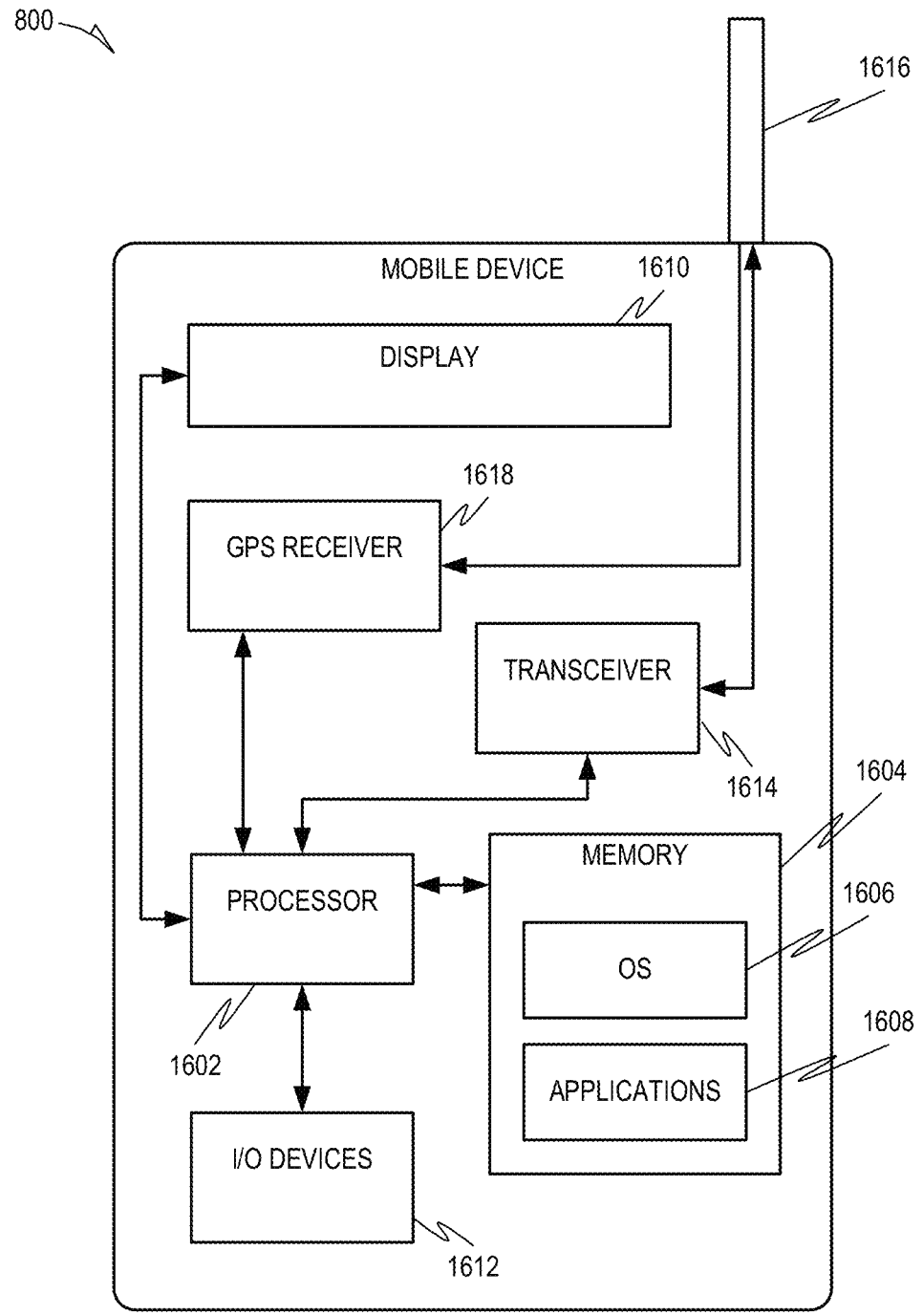
FIG. 12 is a block diagram illustrating a mobile device, according to an example embodiment.

FIG. 12 is a block diagram illustrating a mobile device 1200, according to an example embodiment. The mobile device 700 can include a processor 1602. The processor 1602 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 700. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In various example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
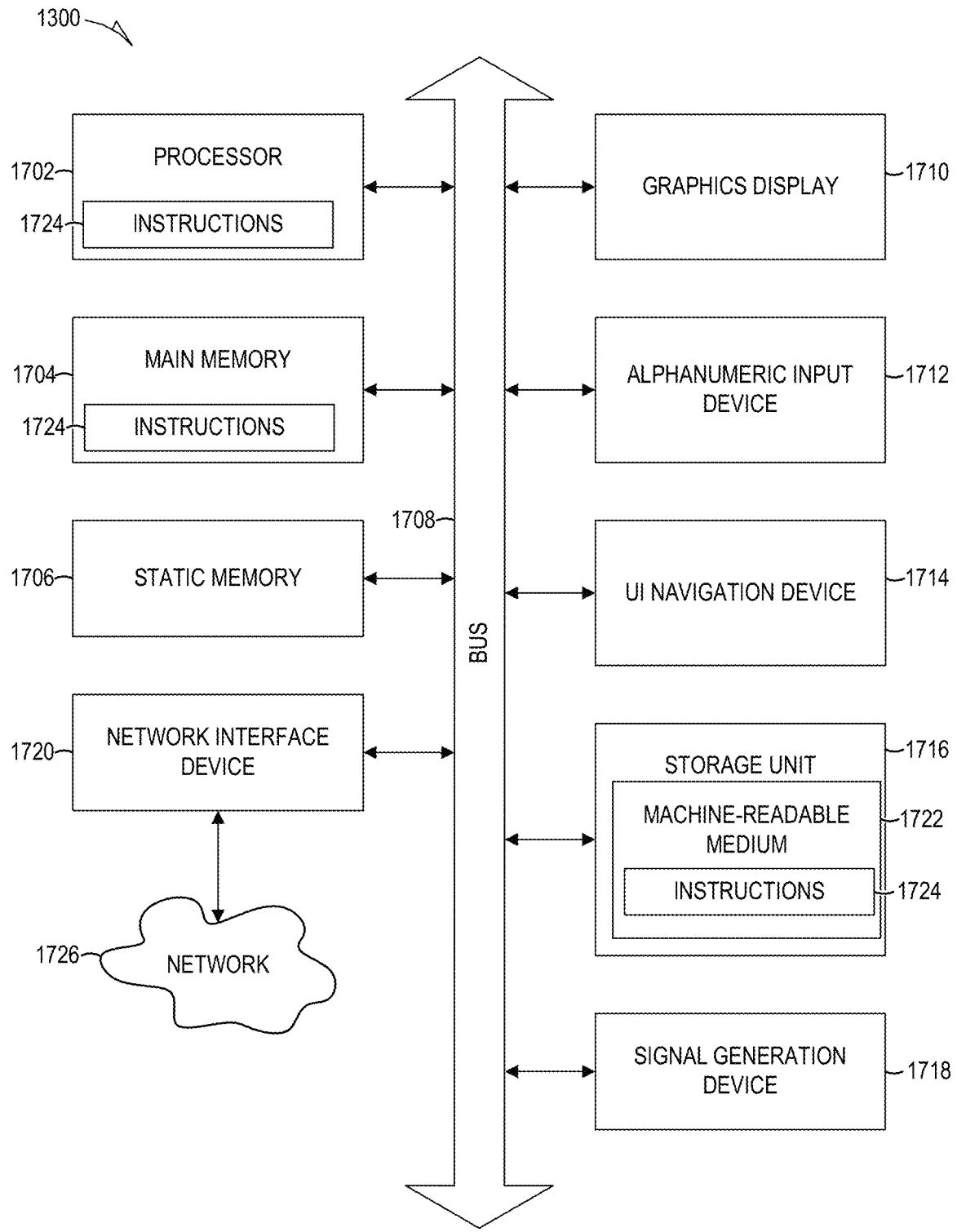
FIG. 13 is a block diagram of machine in the example form of a computer system within which instructions for causing the machine to perform any one or more of the methodologies discussed herein may be executed

FIG. 13 is a block diagram of an example computer system 1300 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 1702 (e.g., a central processing unit (CPU), a graphics processing unit (GPU) or both), a main memory 1704 and a static memory 1706, which communicate with each other via a bus 1708. The computer system 800 may further include a graphics display unit 1710 (e.g., a liquid crystal display (LCD) or a cathode ray tube (CRT)). The computer system 800 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies, operations, or functions described herein. The instructions 1724 may also reside, completely or at least partially, within the main memory 1704 and/or within the processor 1702 during execution thereof by the computer system 800, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples provided herein are provided by way of illustration and under specific conditions using a specific embodiment or embodiments; accordingly, neither these examples nor their implementations shall be used to limit the scope of the disclosure of the current patent document.

It shall also be noted that although embodiments described herein may be within the context of client-side enrichment and transform, aspects of the present disclosure are not so limited. Accordingly, the aspects of the present disclosure may be applied or adapted for use in other contexts.

What is claimed is:

1. A system comprising:
   one or more computer processors;
   one or more computer memories;
   a set of instructions stored in the one or more computer memories, the set of instructions configuring the one or more computer processors to perform operations, the operations comprising:
   capturing observability data pertaining to an API on a client device, the observability data including, for each of one or more functions of the API, a number of times the function is used and a number of times each parameter of the function is used; and
   communicating the observability data pertaining to the API to a target of a plurality of targets based on a type of the observability data, the type being one of a plurality of types, the target configured to provide reporting of one or more bugs pertaining to the API without manual intervention.

2. The system of claim 1, wherein the type of the observability data is an error, a warning, or a debug message.

3. The system of claim 1, wherein the plurality of targets includes one or more of a local IDE, a remote debugger, or a third-party application.

4. The system of claim 1, wherein the observability data further pertains to metrics data associated with a usage of the API on the client device.

5. The system of claim 4, wherein the metrics data is one or more of counters data or gauges data.

6. The system of claim 1, wherein the observability data includes information pertaining to when the API was called during an event processing timeline.

7. The system of claim 1, wherein the observability data further includes information pertaining to a destination for an event that is a subject of a usage of the API.

8. A method comprising:
   capturing observability data pertaining to an API on a client device, the observability data including, for each of one or more functions of the API, a number of times the function is used and a number of times each parameter of the function is used; and
   communicating the observability data pertaining to the API to a target of a plurality of targets based on a type of the observability data, the type being one of a plurality of types, the target configured to provide reporting of one or more bugs pertaining to the API without manual intervention.

9. The method of claim 8, wherein the type of the observability data is an error, a warning, or a debug message.

10. The method of claim 8, wherein the plurality of targets includes one or more of a local IDE, a remote debugger, or a third-party application.

11. The method of claim 8, wherein the observability data further pertains to metrics data associated with a usage of the API on the client device.

12. The method of claim 11, wherein the metrics data is one or more of counters data or gauges data.

13. The method of claim 8, wherein the observability data includes information pertaining to when the API was called during an event processing timeline.

14. The method of claim 8, wherein the observability data further includes information pertaining to a destination for an event that is a subject of a usage of the API.

15. A non-transitory computer-readable storage medium storing a set of instructions that, when executed by one or more computer processors, cause the one or more computer processors to perform operations for processing an event at a client device, the operations comprising:
   capturing observability data pertaining to an API on a client device, the observability data including, for each of one or more functions of the API, a number of times the function is used and a number of times each parameter of the function is used; and
   communicating the observability data pertaining to the API to a target of a plurality of targets based on a type of the observability data, the type being one of a plurality of types, the target configured to provide reporting of one or more bugs pertaining to the API without manual intervention.

16. The non-transitory computer-readable storage medium of claim 15, wherein the type of the observability data is an error, a warning, or a debug message.

17. The non-transitory computer-readable storage medium of claim 15, wherein the plurality of targets includes one or more of a local IDE, a remote debugger, or a third-party application.

18. The non-transitory computer-readable storage medium of claim 15, wherein the observability data further pertains to metrics data associated with a usage of the API on the client device.

19. The non-transitory computer-readable storage medium of claim 18, wherein the metrics data is one or more of counters data or gauges data.

20. The non-transitory computer-readable storage medium of claim 15, wherein the observability data includes information pertaining to when the API was called during an event processing timeline.

* * * * *